United States Patent [19]

Auer

[11] 4,411,183

[45] Oct. 25, 1983

[54] APPARATUS FOR CUTTING PIE-SHAPED OPENINGS IN FIBERBOARD DUCT

[76] Inventor: Mark J. Auer, 23520 Lake Rd., Bay Village, Ohio 44140

[21] Appl. No.: 425,498

[22] Filed: Sep. 28, 1982

Related U.S. Application Data

[62] Division of Ser. No. 169,916, Jul. 17, 1980.

[51] Int. Cl.$^3$ .............................................. B23D 23/02

[52] U.S. Cl. .......................................... 83/581; 83/54; 83/614; 83/618; 83/692; 83/875; 83/917

[58] Field of Search ................. 83/519, 614, 692, 581, 83/917, 54, 875–878, 618; 72/339, 362; 29/157 A; 409/304

[56] References Cited

U.S. PATENT DOCUMENTS 2,837,160 6/1958 Vera et al. ........................ 83/917 X
3,097,684 7/1963 Tartz ................................ 83/917 X
3,299,759 1/1967 Johnson et al. .................. 83/917 X
3,958,482 5/1976 Claesson .......................... 83/917 X

*Primary Examiner*—James M. Meister
*Attorney, Agent, or Firm*—Thomas M. Schmitz

[57] ABSTRACT

Fibrous board transition parts are produced on the job site from standard lengths of preformed fiberboard duct units. Transition parts are interposed between linear runs of duct pieced together to change direction of the duct work. The transition parts, sometimes referred to as elbows or bends, can be easily fabricated on the job site by modifying standard lengths of preformed linear duct by cutting and removing pie-shaped sections from the duct. The modified duct can be bent inwardly to form a one-piece arcuate transition part wherein the outer wall section remains intact and provides structural strength to the transition part. The seams are secured with structural adhesive tape wrapped around the transition part.

5 Claims, 12 Drawing Figures

APPARATUS FOR CUTTING PIE-SHAPED OPENINGS IN FIBERBOARD DUCT

This is a divisional application of Ser. No. 169,916 filed July 17, 1980, copending, and the same is incorporated herein by reference.

This invention pertains to fiberboard duct work useful as an insulated conduit for transmitting hot or cold gases, and more particularly to fiberboard transition pieces for changing the direction of such duct work. Linear fiberboard duct is produced from a wide variety of fibrous boards which can be formed into hollow units having a square or rectangular hollow through-put cross section. Several duct units are secured end to end to provide a continuous run of hollow duct work. For example, fiberboard ducts are shown in U.S. Pat. Nos. 3,242,780; 3,420,142; 3,534,646; and 3,605,534 which suggest methods of constructing linear duct units.

A difficulty encountered while fabricating a run of duct work during installation in a building often involves piecing together the duct units to accommodate the architectural layout and particularly with respect to changing directions of the duct work. Preformed bends or elbows are not particularly suitable and often comprise pieced together parts and sharp right angle turns. For instance, two linear duct units typically are cut and then pieced together to form a sharp 90 degree turn such as suggested in U.S. Pat. No. 3,605,534 and U.S. Pat. No. 3,534,646. However, such two-piece construction is inherently weak, provides undesirable air resistance with the abrupt 90 degree turns, and is inflexible in use since turns other than 90 degrees are difficult to achieve with any useful precision.

It now has been found that a one-piece unitary transition piece can be easily produced on the job site by modifying a linear pre-fabricated duct to produce a wide variety of rounded arcuate transition parts depending on the degree of bend required. In accordance with this invention, linear duct is modified by cutting and removing pie-shaped sections from the duct, and then bending the modified duct to form a transition part. The pie-shaped section consists of corresponding triangular cuts in the top and bottom wall sections together with a corresponding intervening cut in the interior side wall disposed adjacent to the bases of said triangular cuts. The outer side wall section of the modified duct disposed adjacent to the apex of the triangular cuts remains intact and provides structural strength to the finished transition part. The modified duct with the cuttings removed is collapsed laterally together to form a semi-arcuate transition part having a rounded outer side wall. The cut edges are adjacently positioned to form a continuous peripheral seam in the top, bottom, and intervening interior side wall sections, whereupon, the seams are secured with wrapped structural adhesive tape. The transition parts can be formed by utilizing one or more pie-shaped cuts in the linear duct to produce a wide range of arcuate shaped elbows or bends ranging from about 85 to 175 degrees depending on the transition angle required in the duct work layout. These and other advantages will become more apparent by referring to the drawings and the the Detailed Description of the Invention.

SUMMARY OF THE INVENTION

A one-piece fiberboard transition part is produced by the method comprising the steps of cutting one or more pie-shaped cuts in a performed fiberboard linear duct wherein the pie-shaped cuts comprise a triangular cut in the top wall and bottom wall sections of the duct together with a corresponding intervening cut in the interior wall section of the duct, removing said pie-shaped cut or cuts, collapsing the modified duct laterally together to form a transition duct wherein opposed cuts meet to form seams, and securing the seams with adhesive means such as structural adhesive tape to form a one-piece fiberboard semi-arcuate transition part.

Variable angle fiberboard transition pieces can be produced in accordance with this invention by a cutting apparatus comprising a pair of angularly adjustable upper knives adapted to cut vertical cuts in the interior wall of the duct corresponding to the outermost base points of said upper and lower triangular cuts in the top and bottom walls of the duct.

IN THE DRAWINGS

Figure 5A:
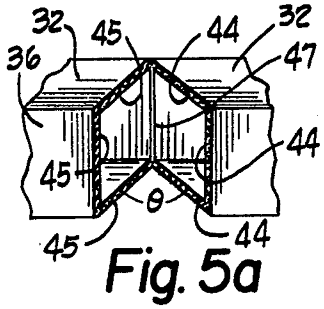
FIG. 5 shows the pie-shaped cuttings in FIG. 4 removed as viewed from the interior side wall of the duct to produce a modified duct.
Figure 5:
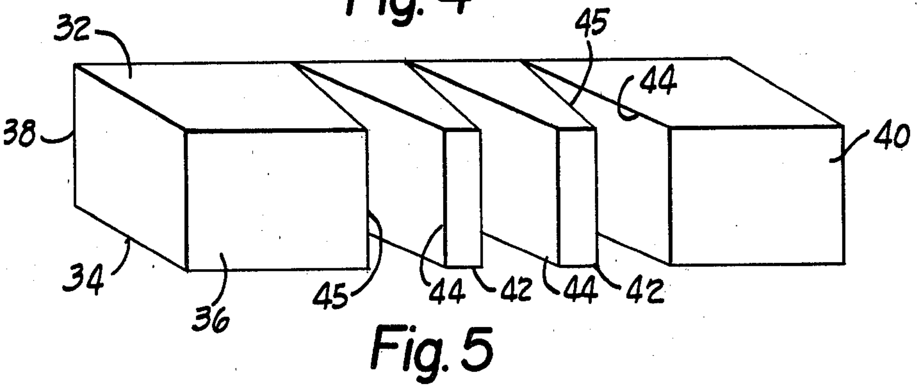
Figure 6:
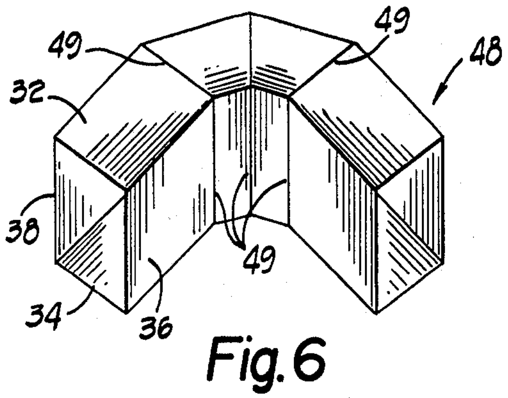
Figure 7:
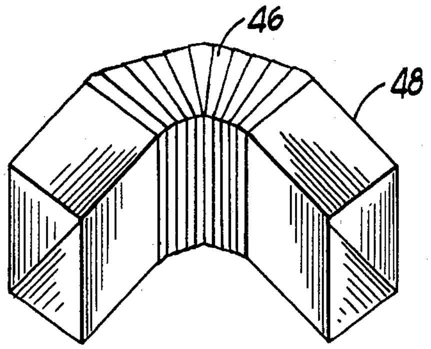
Figure 8:
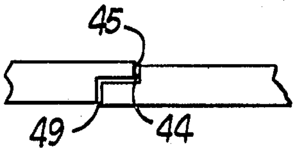
Figure 9:
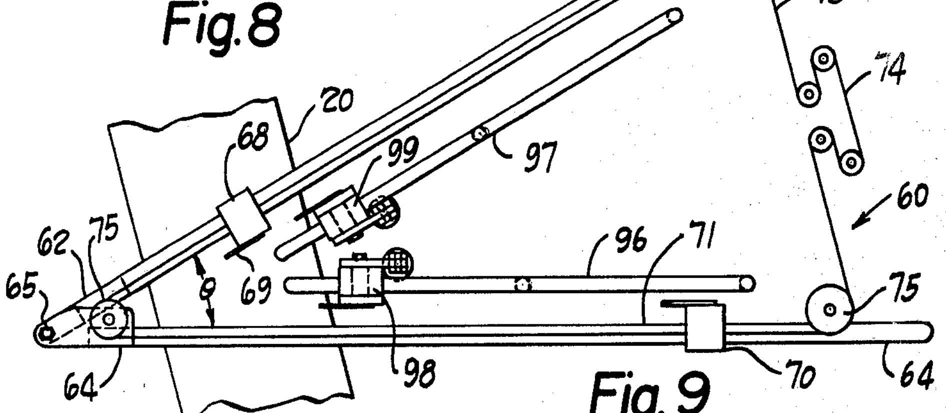

FIG. 5*a* shows one cutting in the modified duct in FIG. 5;

FIG. 6 shows the modified duct in FIG. 5 collapsed laterally together wherein opposed cut edges meet to produce a rounded duct unit;

FIG. 7 shows the duct in FIG. 6 wrapped with structural adhesive tape to secure the seams formed by the cut edges to produce a rounded fiberboard transition duct;

FIG. 8 is an enlarged cross-sectional view of a preferred lap connection between opposed cut edges forming lapped seams in the arcuate fiberboard transition duct;

FIG. 9 is a top plan view of a cutting apparatus for cutting pie-shaped cuttings in linear fiberboard duct to form rounded fiberboard transition duct parts in accordance with this invention.

Figure 10:
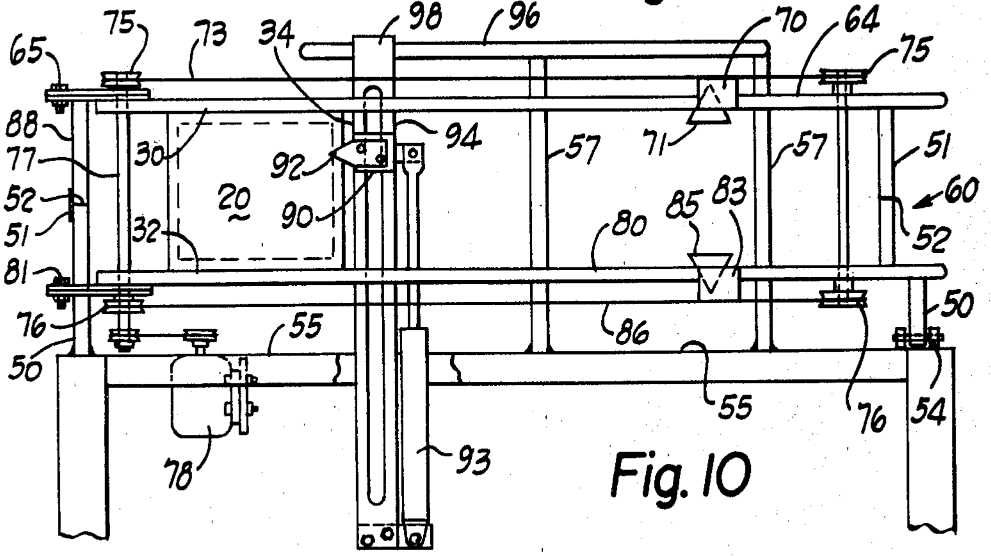

FIG. 10 is a side elevation view of the apparatus shown in FIG. 9.

Figure 11:
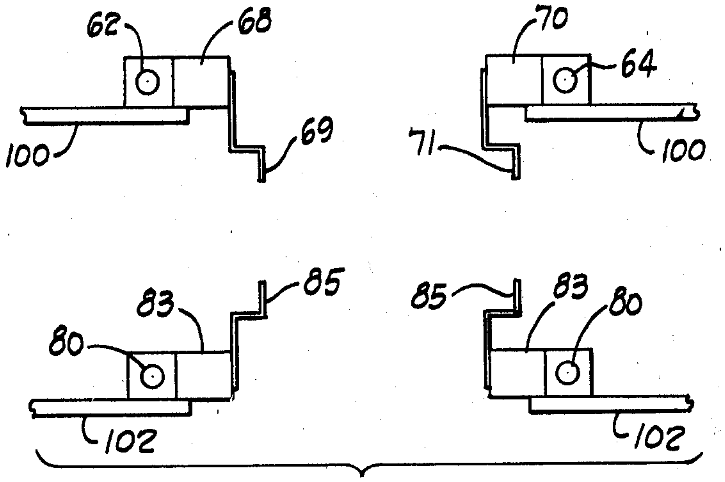
Figure 12:
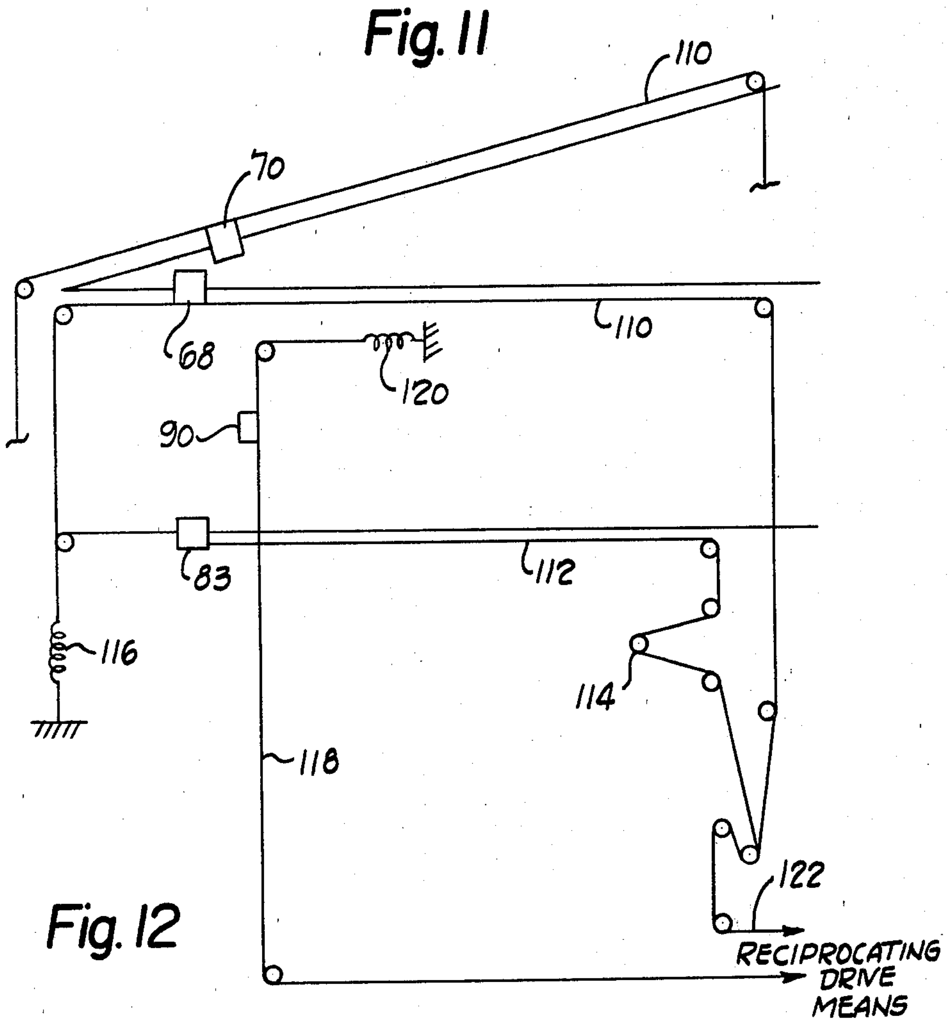

FIG. 11 is a back view of the top and bottom cutters adapted to cut lapped seams shown in FIG. 8; and FIG. 12 is an alternative means for reciprocating the upper and lower cutters.

DETAILED DESCRIPTION OF THE INVENTION

Figure 1:
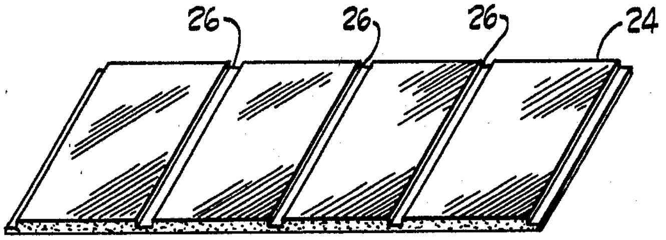
FIG. 1 is a perspective view of a length of grooved fiberboard prior to fabrication into a linear duct unit.
Figure 2:
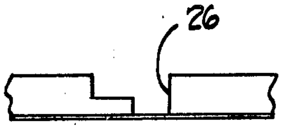
FIG. 2 is an enlarged end view of one of the grooves in the fiberboard in FIG. 1.
Figure 3:
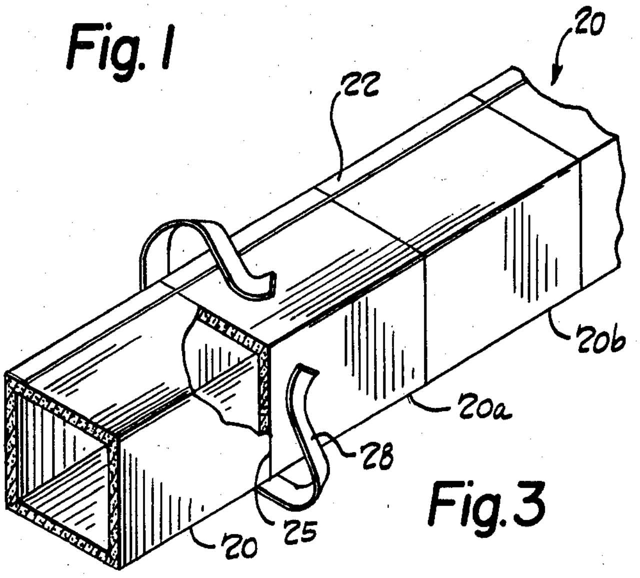
FIG. 3 is a perspective view of fiberboard duct work formed from three fiberboard duct units secured together.

Referring now to the drawings wherein like characters designate like parts, shown in FIGS. 1 and 3 is a preformed linear duct 20 produced by folding the grooved fiberboard 24 containing three grooves 26 into a square cross-sectional hollow fiberboard duct unit 20. FIG. 2 shows a side elevation view of a desirable groove 26 particularly adaptable for folding the fiberboard 24 into a duct 20. As viewed in FIG. 3, duct 20 includes an outer overlap connection 22 to strengthen the linear connection of folded fiberboard. FIG. 3 further illustrates a typical end-to-end connection 25 a first duct unit 20 with a second duct unit 20*a* and a third duct 2*b* wherein the connection 25 is secured by wrapped structural adhesive tape 28 and desirably includes impervious facing material on the outside surface and sometimes on both surfaces such as Owens Corning "Fiberglas" duct board. The facing material can be aluminum foil or hard plastic sheeting such as vinyl material.

Figure 4:
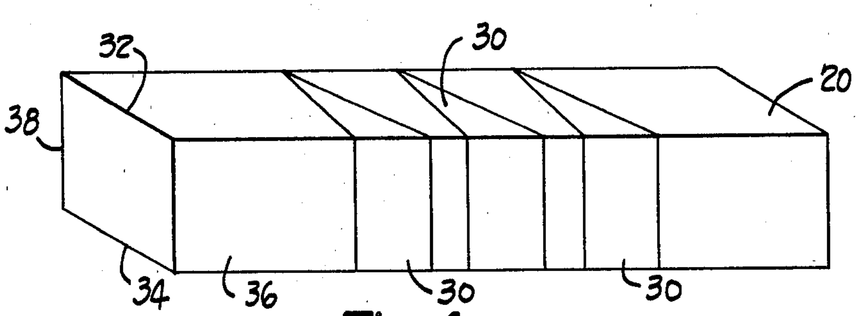
FIG. 4 shows three spaced pie-shaped cuttings in one unit of fiberboard duct as viewed from the interior wall of the duct wherein each pie-shaped cutting comprises corresponding triangular cuts in the top and bottom walls together with an intervening cut in the interior wall corresponding to the bases of the triangular cuts.

Referring now to FIG. 4, a linear fiberboard duct unit 20 is modified by cutting one or more pie-shaped cuttings 30 comprising corresponding triangular shaped cuttings in top wall 32 and bottom wall 34 of the duct 20 and intervening vertical cuttings in the interior side wall 36 corresponding to outermost points of the bases of the triangular cuts. The triangular pie-shaped cuts 30 terminate outwardly prior to the juncture with the outer side wall 38 of the duct 20 whereby the outer wall 38 remains intact and maintains structural strength as well as unitary construction to a modified duct 40 with the cuttings 30 removed as viewed in FIG. 5. The modified duct 40 contains intervening duct sections 42 integral with the outer duct wall 38 and having opposed cut edges 44, 45 on the top 32, bottom 34 and interior side 36 walls of the modified duct 40. Although not necessary, the opposed edges 44, 45 can be cut as opposed lapped edges as best viewed in FIG. 8.

The modified duct 40 is collapsed laterally inwardly to bring the opposed cut edges 44, 45 in engagement to form a semi-arcuate duct 48 having seams 49 formed in the top 32, bottom 34, and interior side 36 walls of the arcuate duct 48. The outer side wall 38 remains intact, although the interior portion of the outer wall 38 can be scored or slightly v-grooved 47 in a vertical line in alignment with the apexes of the triangular cuts to facilitate bending and formation of a rounded outer side wall 38. Thus, the formed angular duct 48 contains a gradually rounded outer side wall 48 particularly suitable for efficiently redirecting air flow without interjecting substantial counteracting frictional forces to air flows through the fiberboard transition piece. As viewed in FIG. 7, the seams 49 are tightly secured by wrapping structural adhesive tape 46 around the wall sections, including preferably the outer side wall 38, whereby structural integrity is produced and maintained in conjunction with the unitary outer side wall 38. The rounded transition piece can be interconnected to a linear duct unit by taping the juncture 25 therewith with tape 28 in the same manner as viewed in FIG. 3.

Referring now to FIGS. 9 and 10, shown generally is an apparatus 60 particularly suitable for modifying linear fiberboard duct units 20 in accordance with this invention by cutting triangular cuts in both the top 32 and bottom 34 wall sections of the duct 20 as well as cutting the contiguous interior wall 36 portion dispersed between the base lines of the triangular cuts. FIG. 9 is a top plan view of the apparatus 60 and illustrating a pair of diverging adjustable upper cutting guides 62, 54 pivotally connected at 65 for adjusting angle $\theta$ between the guides 62, 64 which in turn corresponds to the desired angle $\theta$ opposite the base in the triangular cuts in the top 32 and bottom 34 walls of the duct 20. This angle $\theta$ disposed between the upper guides 62, 64 can be adjusted and varied broadly from about 5 to 85 degrees although preferably $\theta$ will vary between about 20 and 50 degrees and two or more pie-shaped sections 30 will be cut and removed from each duct 20 to provide a rounded transition duct 48. The upper guide 62 contains a movable cutting means comprising a movable bracket 68 slideably engaging guide 62 and having a downwardly depending knife blade 69. Upper guide 64 contains a movable bracket 70 slideably engaging guide 64 and having a downwardly depending knife blade 71. The forward knife blade 69 as viewed in FIG. 9 is laterally off-set from the rearward knife blade 71 to avoid interference between the respective brackets 68, 70 while cutting the point of the triangular cut proximate to the pivot point 65, whereby the forward knife 69 moves forwardly while the rearward knife 71 moves rearwardly. The movement of the knives 69, 71 is reversed when knife 71 is moved forwardly to cut the duct 20 prepositioned in the apparatus 60. To facilitate the reciprocating cutting of the knives 69, 71, knife brackets 68, 70 are connected to a continuous upper drive wire 73 adapted to automatically and simulteneously move the blades 69, 71 in the spaced relationship while the wire moves clockwise or counterclockwise, reciprocating movement, as the case may be. The length of the wire to accommodate variable angle cuts can be adjusted by a series of adjusting wheels 74. The drive wire 73 is driven by a plurality of upper rotating wheels 75 which in turn are interconnected to lower guide wheels 76. Both the upper 75 and lower 76 wheels are operatively interconnected to a reciprocating drive means such as a reciprocating motor 78 which functions to operate the forwardly disposed wheels 75, 76.

In a manner similar to the upper cutting means, the apparatus 60 includes corresponding lower cutting means comprises lower guide members 80, 80 pivotally connected at 81 to form an intervening cutting angle $\theta$ in the bottom wall 34 of duct 20. The lower guides 80, 80 similarly contain movable knife brackets 83, 83 having upwardly directed cutting knives 85, 85 adapted to cut triangular cuts in the bottom wall 34 of duct 20. A lower drive wire 86 interconnects with the lower knife brackets 83, 83 to provide reciprocating clockwise or counterclockwise movement of the knives 85, 85. The upper knives 69, 71 and the lower knives 85, 85 operate in unison through operative interconnection of the lower wheels 76 with upper wheels 75 by interconnecting spindles 77. The lower wheels 76 are vertically adjustable on spindles 77 to accommodate variable heights of the duct 20. The lower guides 80, 80 are vertically supported in a work surface 55 by vertical supporting posts 50. The upper guides 62, 64 can be laterally moved inwardly or outwardly to decrease or increase the cutting angle $\theta$ in unison with the lower guides 80, 80. The rearward supports 50 are laterally movable on the work surface 55 by sliding or by wheels means 54 or other convenient movement means.

As viewed in FIG. 10, the apparatus 60 further includes a pair of vertically disposed cutting means for cutting laterally spaced parallel vertical cuts in the interior side wall 36 wherein the parallel vertical cuts are in alignment with the base angle points of the triangular cuts. The vertical cutting means comprises vertical knives 92, 92 secured to vertically movable slide brackets 90, 90 adapted to slide within a slotted vertical channel 94. The knives 92, 92 move upwardly or downwardly in response to a reciprocating cylinder-plunger piston means 93 which can be activated by a solenoid or similar activating device. The piston means 93 can be secured to the vertical channel 94. Preferably both vertical cutting knives 92, 92 work in unison. The supporting slotted channels 94, 94 are supported overhead by upper support members 96, 97 by slideable fixtures 98, 99 whereby the vertical cutting knives can be adjusted laterally to accommodate the width of the cut in the interior side wall 36 corresponding to the bases of the triangular cuts. The overhead supports are vertically supported on the table work surface 55 by vertical posts 57 which are slideable along the surface 55 for proper alignment of the vertical knives 92, 92.

FIG. 11 shows a desirable alignment of the upper 69, 71 and lower 85, 85 knives as well as an alternative embodiment for supporting the knives. The upper 69, 71 and lower 85, 85 knives are particularly formed to produce matching lapped fiberboard cuts 44, 45 to provide a lapped connecting seam 49 as best viewed in FIG. 8. The off-set knives shown in FIG. 11 are further supported by upper brackets 68, 70 resting on an upper plate 100 and lower brackets 83, 83 supported on a lower plate 102. The lower plate 102 can be vertically adjustable although either or both plates 100, 102 can be adjustable to accommodate different size ducts.

FIG. 12 is still a further alternative embodiment comprising a simplified reciprocating drive means for activating and reciprocating the various cutting knives. The activating means comprises drive wires 110 connected to each upper knife bracket 68, 70 and drive wires 112 interconnected to each lower knife bracket 83, 83 wherein each lower drive wire 112 is adjustable to accommodate the height of the duct 20 by an adjusting wheel 114. The wires 110, 112 are spring loaded as shown at 116. Similarly, the vertical knife brackets 90 are interconnected to a drive wire 118, spring loaded at 120, and further connected to a reciprocating drive means. The reciprocating drive means can be a manual foot pedal or an automatic off-set cam means. The upper 110, lower 112, and vertical 118 drive wires can be operated in unison by a common lead wire 122, or separately.

In use, a linear fiberboard duct is positioned within the apparatus with the outer side wall 36 disposed closest to the pivot point 65 and the inner side wall positioned for engagement with the vertical knives 92, 92. The upper guides 62, 64 and lower guides 80, 80 are adjusted to the desired cutting $\theta$ whereupon triangular cuts are made in the top 32 and bottom 34 walls in the duct 20. The vertical knives are aligned with outer most base points of the triangular cut whereupon the vertical cuts are made in the interior wall 36, whereby a pie-shaped cutting can be removed from the duct 20. The modified duct is then formed into rounded transition duct as shown in FIGS. 6 and 7 whereupon the transition duct can be secured to linear duct work in the manner shown in FIG. 2. It can be readily seen that a wide variety of duct transition parts can be produced with semi-arcuate outer surfaces and having bends ranging from about 85 to 175 degrees. The rounded transition parts can contain one or more pie-shaped cuttings wherein the triangular cutting can be equal or unequal. For instance, a 90 degree bend could contain two 45 degree cuts, or three 30 degree cuts, or two 20 degree and one 50 degree cuts. Similarly a 150 degree bend can contain three 50 degree cuts or two 60 degree cuts plus one 30 degree cut.

The merits and usefulness of this invention are considerable and variations hereof are contemplated. The description and drawings are not intended to be limiting except by the appended claims.

What is claimed is:

1. Apparatus for cutting pie-shaped cuttings in a linear unit of fiberboard hollow duct having an upper wall, a lower wall, an inner sidewall, and an outer sidewall wherein each pie-shaped cutting comprises corresponding triangular cuts in the duct upper and lower walls and intervening vertical cuts in the duct interior sidewall corresponding to the base of the triangular cuts, the apparatus comprising:

a pair of movable upper knives movably supported on a lower guide means and adapted to cut a triangular cut in the upper duct wall with the apex angle adjacent to the outer sidewall and the base adjacent to the inner sidewall, said guide means adjustable to provide an apex angle cut between about 5 and 85 degrees;

a pair of movable lower knives movably supported on a lower guide means and adapted to cut a triangular cut in the lower duct wall corresponding and vertically below to the triangular cut in the upper duct wall;

and a pair of vertically movable knives movably supported on support means adapted to align with the base points of the corresponding upper and lower triangular cuts to produce pie-shaped cuts capable of being removed from the duct;

and said knives operated by drive means to cause reciprocating cutting movement of said knives.

2. The apparatus in claim 1 wherein the upper and lower guide means can be varied to provide pie-shaped cuts having an apex angle between about 20 and 50 degrees.

3. The apparatus in claim 1 wherein the upper knives and the lower knives are operative by a drive wire.

4. The apparatus in claim 1 wherein the drive means comprises a manually operated peddle.

5. The apparatus in claim 1 wherein the drive means comprises an automatic drive means.

* * * * *